United States Patent Office 3,608,387
Patented Sept. 28, 1971

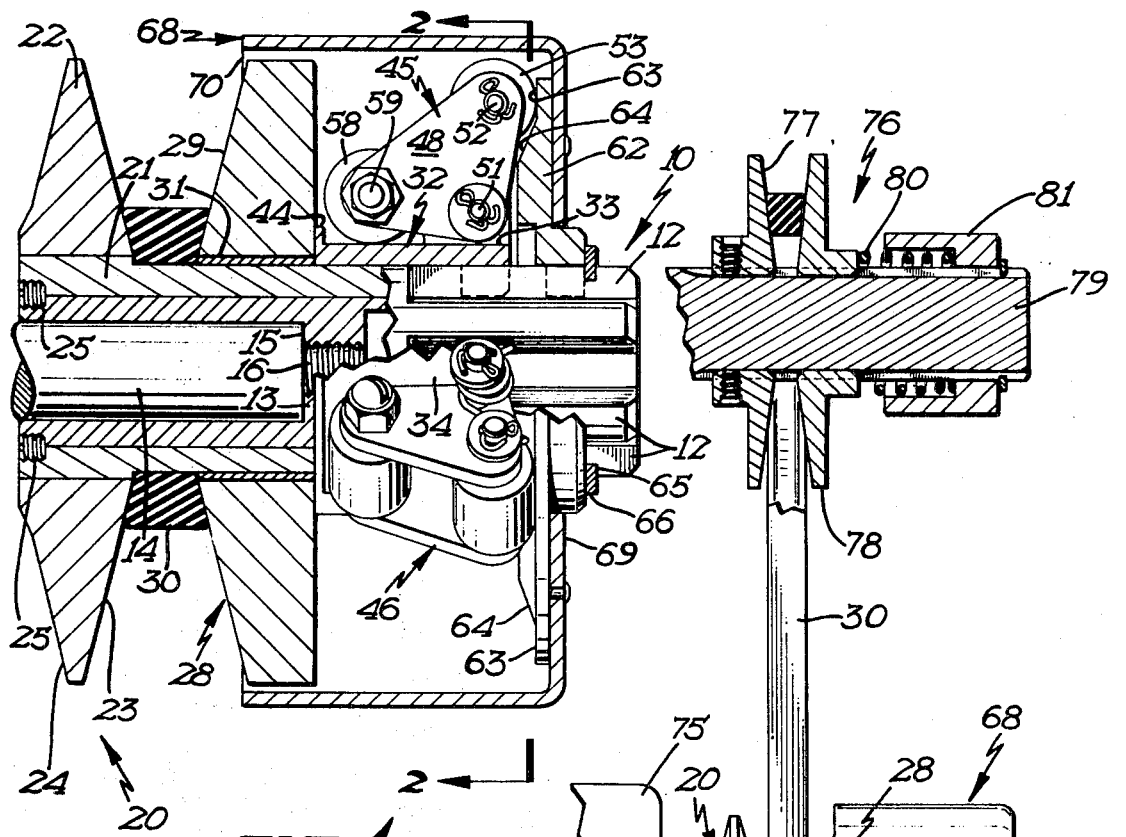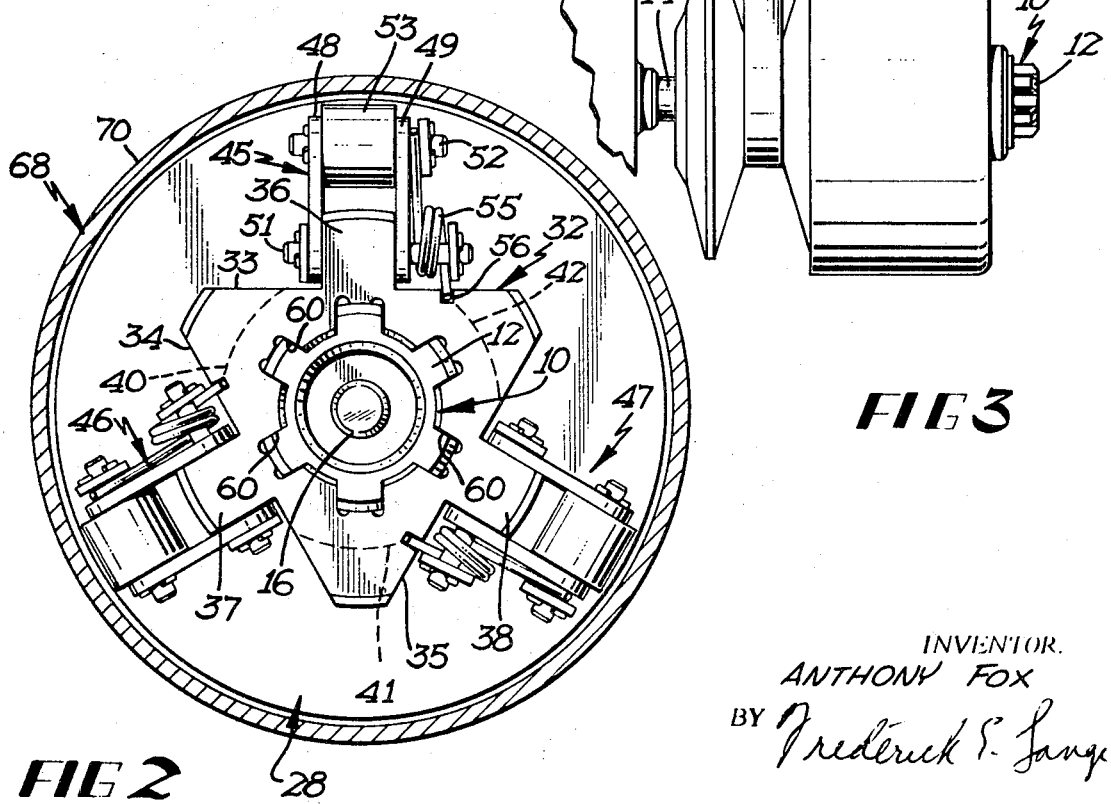

3,608,387
CENTRIFUGALLY CONTROLLED, VARIABLE DIAMETER PULLEY
Anthony Fox, Bloomington, Minn.
(8306 Queen Ave. S., Minneapolis, Minn. 55431)
Filed Aug. 19, 1969, Ser. No. 851,279
Int. Cl. F16h 55/52
U.S. Cl. 74—230.17                            8 Claims

ABSTRACT OF THE DISCLOSURE

A centrifugally controlled, variable diameter, V-belt pulley designed to act as a torque converter, the pulley having pulley members with opposing inclined surfaces, one of which is fixed to a shaft and the other of which is nonrotatably and slidably secured to the shaft, a third member fixed to the shaft and having a bearing face, and a plurality of weighted triangular arms pivotally secured to a portion operatively connected to the slidable pulley member. Each of these arms carries a roller adapted to engage the bearing face of the third member. These arms are biased inwardly and when the pulley is rotated, the arms swing outwardly to force the rollers against the bearing surface and move the two pulley sections together.

BACKGROUND OF THE INVENTION

In many types of applications, it is desirable to have a centrifugally controlled, variable diameter, V-belt pulley. Such pulleys may be used as a driving pulley along with a variable diameter driven pulley. As the speed of the driving shaft changes, the pulley sections are moved together or apart to vary the relative speed of the driving and driven shafts. For instance, an increase in speed of the driving member may be effective to increase the effective diameter of the driving pulley to in turn increase the speed of the driven member, thus acting to operate the driven member at the maximum speed possible for the load on the driven member. When used in this manner, such a unit acts as a torque converter.

Torque converters of this type are particularly suitable for use with relatively lightweight self-propelled vehicles, such as snowmobiles, motorcycles and the like. Particularly in such applications, it is very desirable to have a unit which is extremely compact and has a minimum number of moving parts. While devices of this type are broadly old, the difficulty has been that many of these prior devices have had an excessive number of moving parts or have, by nature of their design, been necessarily quite bulky.

SUMMARY OF THE PRESENT INVENTION

The present invention is concerned with a variable diameter V-belt pulley of the centrifugally controlled type which is extremely compact and has a minimum number of moving parts.

Basically, I accomplish this by providing a plurality of weighted arms which are pivotally connected to a member which is operatively connected to one of the pulley members and which is slidable upon the shaft, these arms carrying rollers bearing against a bearing surface of a member rigidly secured to the shaft. As the weighted levers are forced outwardly due to centrifugal force, the rollers thereof bear against the bearing surface and force the member to which the weighted members are secured and hence the associated pulley member in the direction of the other pulley member. In this way, as the shaft to which the pulley is secured tends to speed up, the diameter of the pulley is increased. Where the variable pulley is used as a driving member, this will result in an increase in the speed of the driven member. The two pulley sections are normally so spaced that they exert relatively little pressure on the belt so that initially the driving pulley is effectively disconnected from the driven pulley. The unit thus acts as a clutch. At any time that the load on the driven shaft becomes sufficiently great as to cause the driving shaft to slow down, the weighted arms tend to swing back by reason of their individual bias and this in turn tends to result in greater torque being applied to the driven member at reduced speed. The variable diameter pulley thus acts to adjust the pulley ratio so as always to drive the driven member at the maximum possible speed consistent with the load thereon.

The portion to which the weighted arms are secured is specifically formed as a triangular member having ears projecting from each of the flat sides, each weighted member being pivotally secured to one of the ears. The slidable pulley member and the portion to which the weighted arms are secured are preferably connected by suitable spline connections to the shaft so as to permit relatively sliding movement while preventing relative rotation of these portions with respect to the shaft.

Various features and objects of the invention will be apparent from a consideration of the accompanying specification, claims and drawing.

BRIEF DESCRIPTION OF THE DRAWING

FIG. 1 is a vertical view of my improved variable diameter pulley with portions thereof shown in elevation;

FIG. 2 is a vertical sectional view taken along the line 2—2 of FIG. 1 in the direction of the arrows adjacent that line; and FIG. 3 is a schematic view, partly in section, showing my improved pulley arrangement in connection with a driven pulley and a fragmentary portion of a motor connected to my pulley arrangement to drive the same.

DESCRIPTION OF THE PREFERRED EMBODIMENT

Referring to FIG. 1, the numeral 10 is employed to indicate in its entirety a hollow shaft which over a portion thereof has a plurality of spline ribs 12 projecting therefrom. At an intermediate portion of the interior of the shaft 10, there is a threaded inwardly extending annular shoulder portion 13. A shaft 14 has an external diameter corresponding to the internal diameter of the main cylindrical opening in the left-hand portion of shaft 10 and is provided with a shoulder which abuts the shoulder 13 at 15. The shaft terminates at its inner end in a threaded portion 16 of reduced diameter which is threadedly engaged with the interior of the shoulder member 13 of the hollow shaft 10. The solid shaft 14 is accordingly rigidly secured to the hollow shaft 10 and the two shaft members 10 and 14 are effectively connected together to work as a unit. The shaft 14, while shown as broken away, actually extends outwardly through the left hand end of the hollow shaft 10.

Surrounding the outer hollow portion of hollow shaft 10 is a first pulley member 20. This pulley member consists of a sleeve 21 and a flange 22 which has a conical face 23 to act as one of two inclined belt engaging surfaces. The pulley member 20 may also have an outer inclined surface 24, the purpose of this being to cause the pulley member 20 to be broader at its base and hence have more structural strength. The sleeve 21 and the flange 22 may be integral with each other or may be two separate members rigidly secured together as by brazing. The sleeve 21 of pulley member 20 is nonrotatably secured to the hollow shaft 10 in any suitable manner as being force fitted thereon. In order to guard against any possible relative slippage, a plurality of set screws 25 are threadedly secured in apertures which are partially in the hollow shaft 10 and partially in the pulley member 20. The set screws may be of any suitable type such as Allen set screws. Thus, in operation, the pulley member 20 and the hollow shaft 10 operate as a single unit and could, as far as the present invention is concerned, be formed integrally with each other. The sole purpose of making the pulley member 20 and the hollow member 10 as separate members is to facilitate machining of these two members.

Slidably secured on the hollow shaft 10 is a second pulley member 28. This pulley member 28 has a conical face 29 facing the inclined face 23 of pulley member 20. This conical face 29 provides a second of the two inclined belt engaging surfaces. It will be noted that a V-belt 30 shown in section is disposed between the two inclined faces 23 and 29. The pulley section 28 has a bearing member 31 secured in the central aperture thereof, the internal diameter of this bearing member corresponding to the external diameter of the sleeve 21 of pulley member 20.

Also surrounding the hollow shaft 10 and slidably secured thereto is a sleeve member 32. The sleeve member 32, in a specific example shown, is rigidly secured to the second pulley member 28 in any suitable manner as being welded thereto. The sleeve member is preferably formed with three flat sides adjacent the outer portion thereof, as best shown in FIG. 2. These flat sides are designated by the reference numerals 33, 34 and 35. This portion of the sleeve 32 thus has a generally triangular cross section. Extending from each of the flat sides 33, 34 and 35 are integral ear members 36, 37 and 38. The sleeve member 32 is preferably formed of a piece of cylindrical stock having an outer diameter equivalent to the distance between the outer extremity of ear 36 and the curved portion joining sides 34 and 35. The triangular portion is formed by machining away portions to provide the flat sides 33, 34 and 35 while leaving the ears 36, 37 and 38. The outer portion of the sleeve (the left-hand portion as viewed in FIG. 1) is further machined away as shown by the dotted lines 40, 41 and 42 to provide three cylindrical surfaces merging with the flat sides 33, 34 and 35. At its extreme outer end, there is a flange 44 which, in the preferred embodiment, is firmly secured to the pulley section 29 in any suitable manner.

Pivotally secured to each of the ears 36, 37 and 38 is a weighted arm, these arms being designed by the reference numerals 45, 46 and 47. Since the three arms are identical, only the arm 45 will be described in detail. The arm 45 consists of two triangular plates 48 and 49 of the same size and configuration. At each corner of each of these triangular plates, there is a circular aperture through which a pin extends. Referring to FIG. 1, a pivot pin 51 extends through the aligned apertures in the lower right-hand corners of plates 48 and 49 and through the ear 36. The pin is retained in position by a suitable means, such as cotter pins. Extending through the aligned apertures in the upper right-hand corner of the triangular plates 48 and 49 is a pin 52 likewise held in position by suitable fastening means, such as cotter pins. Journalled onto pin 52 is a roller 53 which preferably is formed of a material having a relatively low coefficient of friction such as a synthetic amide material commercially sold as nylon. A spring 55 has a plurality of turns surrounding the pin 51. One end of this spring extends into and engages a notch 56 in the flat surface 33 of sleeve member 32. The opposite end engages the pin 52. The spring 55 serves to bias the weighted arm 45 in a counterclockwise direction (as viewed in FIG. 1).

A roller 58 is journalled on a pin 59 extending through the aligned apertures in the lower left-hand corner of plates 48 and 49 and retained in place by any suitable fastening mass such as a pin head and a nut. The roller 58 is biased into engagement with the flat surface 33 of sleeve 32 by the spring 55. The roller 58 may be of metal and preferably has appreciable mass so that it acts along with the arms 48 and 49 to impart sufficient mass to the weighted arm 45 to cause the arm 45 to swing in a clockwise direction against the action of biasing spring 55 when the sleeve 32 is rotated.

As previously noted, there are two other arms 46 and 47 secured to the ears 37 and 38, respectively, which are similar in construction to arm 45. Thus, upon rotation of the shaft 10, the three arms 45, 46 and 47 swing outwardly, the motion of the arms being such that the rollers 53 tend to move away from the pulley sections 20 and 28.

The sleeve 32, as previously noted, is associated with the pulley section 28. In the specific embodiment shown, the sleeve 32 is firmly secured to pulley section 28. The sleeve 32 is slidable upon but nonrotatable with respect to the sleeve 21 of pulley member 20. As previously pointed out, the hollow shaft 10 is provided with a plurality of spline teeth 12. The sleeve 32 is similarly provided with a plurality of slots 60 into which the spline teeth 12 extend. Because of the cooperating spline teeth 12 and slot 60, it will be obvious that relative rotation of sleeve 32 with respect to shaft 10 is prevented. Since the sleeve 32 is fixedly secured to the pulley member 28, it will be obvious that the pulley member 28 is likewise slidably but nonrotatably positioned with respect to shaft 10.

Also connected by spline connections with hollow shaft 10 is a bearing member 62. This bearing member has an annular portion 63 adjacent its outer periphery. Adjoining this flat annular surface 63 is a conical surface 64, which is inclined outwardly towards the center of the bearing member and in the direction of the weighted arms 45, 46 and 47. The bearing member 62, while splined to the shaft 50 by means of grooves straddling the splines 12, is prevented from inward movement by means of a split ring 66 which abuts the inner wall of bearing member 62 and extends into a groove 65 in a hollow shaft 10. Secured to the bearing member 62 is a housing member 68 which has a vertical end wall 69 secured to the bearing member and a cylindrical housing portion 70 surrounding the rollers 45, 46 and 47 and partially surrounding the pulley section 28. If desired, the bearing section 62 and the housing 68 may be formed out of a single piece of metal.

It will be noted that in the position shown in FIG. 1, pulley members 20 and 28 are spaced sufficiently apart that the belt 30 is engaging the sleeve 21 of pulley section 20. Under these conditions, it tends to slip with respect to the pulley sections since the pressure of its engagement with inclined faces 23 and 28 is minimal. As the shaft 14 secured to the hollow shaft 10 is rotated, the arms 45, 46 and 47 tend to swing in such a direction as to move the rollers 53 against the bearing member 63. Since the bearing member 63 cannot move inwardly due to the split ring 66, the pressure of the rollers 63 against the bearing surface 62 tend to cause a force to be applied to a sleeve 32 in the direction of pulley member 20. Since sleeve 32 is fastened to the pulley section 28, this forces the pulley section 28 towards the pulley section 20. As will now be described, the driving pulley of this type is used with a driven pulley which likewise can adjust its effective diameter.

Referring to FIG. 3, I have shown my pulley in connection with a prime mover and in connection with a driven pulley. The shaft 14 is shown as connected to a motor 75, only a small portion of the motor being shown. While the shaft 14 is shown in FIG. 3 as the shaft of the motor, it is to be understood that in normal practice, the motor will have a separate shaft and a suitable coupling member will be interposed between the shaft of the motor and the shaft 14 of the driving pulley.

The reference numeral 76 is employed to indicate a driven pulley of a variable diameter type. This comprises two pulley sections 77 and 78 which have oppositely inclined belt engaging surfaces and with which the belt 30 is in engagement. The pulley section 77 is rigidly secured to the output shaft 79 and the pulley section 78 is slidably but not rotatably secured to shaft 79 as by spline connections. The shaft 79, only a portion of which is shown in the drawing, is supported in suitable bearings, not shown. The pulley section 78 is biased in the direction of pulley section 77 by a coil spring 80 which is interposed between the pulley section 78 and a member 81 held against outward movement with respect to shaft 79. The pulley sections 77 and 78 are in the position shown when the input shaft 14 and the output shaft 79 are at rest. As pulley sections 20 and 28 of the driving pulley are moved towards each other and force belt 30 outwardly on the inclined surfaces 23 and 29 of pulley sections 20 and 28, the belt 30 tends to force the pulley sections 77 and 78 of pulley 76 apart against the biasing action of spring 80. This action occurs because the belt 30 is of a fixed length and as the effective diameter of the driving pulley increases, it is necessary for the effective diameter of the driven pulley 76 to correspondingly decrease. The tension of coil 80 is selected so as to maintain the proper tension on belt 30.

It will now be readily apparent that as the driven shaft 14 increases in speed, the effective diameter of my driving pulley is increased and that of the driven pulley is decreased. This results in a higher speed of rotation of the driven shaft. Thus, as the load connected to shaft 79 begins to move, the speed of the shaft is increased. If at any time, the load on shaft 79 increases so as to slow down the speed at which this shaft is driven and hence to slow down the speed of the driving shaft 14, the weighted arms 45, 46 and 47 swing back towards their original position allowing pulley sections 20 and 28 of the driving pulley to separate more and decrease the effective diameter of the pulley section. The pulley sections 77 and 78 of driven pulley 76 move together by a corresponding amount so as to decrease the effective diameter of the driven pulley with respect to the driving pulley and hence to allow more torque to be applied to the driven shaft.

It will readily be seen that with this arrangement, the output shaft 79 is always driven at as high a speed as is permitted by the load on the shaft. Where the shaft 79 is connected to the driving mechanism of a vehicle such as a snowmobile, this will result in the maximum possible speed of the snowmobile being obtained as quickly as possible.

It will also be seen from the foregoing description that the variable diameter pulley of my invention can be extremely compact. By placing the biasing springs on the arms 45 rather than around the shaft 10, it is possible to reduce the overall diameter of the unit. By reason of the shape of the triangular weighted arms and the location of the bearing member 62 with respect to these arms, it is possible to pivotally attach the arms 45, 46 and 47 very close to the outer periphery of the sleeve 32.

I have shown sleeve 32 to which the weighted arms are attached as a separate member securely fastened to the pulley member 28. It is, of course, possible to form the pulley member 28 and the sleeve 32 of a single piece of material. It is also possible for sleeve member 32 to be a separate member from pulley 28 providing that pulley member 28 is likewise splined to the sleeve 21. In this case, the sleeve 32 would merely abut the pulley member 28.

In general, while I have described a specific embodiment of my invention, it is to be understood that this is for purposes of illustration only and that various modifications can be made within the scope of my invention.

I claim as my invention:

1. A centrifugally controlled, variable diameter V-belt pulley having a pair of oppositely inclined belt-engaging surfaces, said pulley comprising:
   an input shaft,
   a first pulley member fixedly secured to said input shaft and having one face thereof inclined to provide one of said inclined belt engaging surfaces,
   a second pulley member slidably mounted on said input shaft and having a face thereof inclined to provide the other of said inclined, belt-engaging surfaces,
   a third member slidably secured around said shaft and operatively connected to said second pulley member,
   means associated with one of said two last-named members for preventing relative rotation between said second pulley member, said third member, and said shaft,
   a fourth member rigidly secured to said shaft on the opposite side of said second pulley member from said first pulley member and having a bearing surface on one face thereof facing said second pulley member, and
   a plurality of weighted arms pivotally secured to said third member, each of said arms having three extremities defining a triangle, a first of said extremities being normally disposed outwardly of the other two extremities and carrying a nonfriction member adapted to engage the bearing surface of said third member,
   each of said arms being pivotally secured to said third member at a second extremity of said arm constituting one of the two inner extremities of said arm and having a mass secured adjacent to the third extremity of said arm, said third extremity being displaced on the side of said second pulley member from a line extending between the first and second extremities of the arm so that as said shaft rotates, the centrifugal force resulting from the mass adjacent each third extremity tends to cause rotation of said arms to force said nonfriction members against the bearing surface of said third member to force said third member and hence said second pulley member towards said first pulley member to increase the effective diameter of said pulley member.

2. The pulley of claim 1 in which each of said weighted arm is biased so as to tend to move the nonfriction member thereof away from said bearing surface of said fourth member.

3. The pulley of claim 2 in which said biasing means consists of a coil spring having its opposite ends acting on said arm and said second member.

4. The pulley of claim 1 in which said third member is operatively connected to said second pulley member in such a way as to prevent relative rotation of said second pulley member and said third member and in which the third member and said shaft have cooperating spline teeth and grooves to prevent relative rotation of said second pulley member and said third member with respect to said shaft while permitting relative sliding movement.

5. The pulley of claim 1 in which said third member has a triangular portion surrounding said shaft, said triangular portion having an ear extending outwardly from each of the sides thereof, to each of which ears one of said weighted arms is pivotally secured.

6. The pulley of claim 1 in which each of said weighted arms comprises two spaced, triangular plates, the three corners of which constitute the three extremities of the arm and said nonfriction member being in the form of a roller secured between said plates adjacent the corner constituting the first extremity of said arm.

7. The pulley of claim 6 in which said mass is in the form of a further roller secured between the triangular plates of each of said weighted arms adjacent a third corner of said triangular plate constituting the third extremity of the arm.

8. The pulley of claim 1 in which said nonfriction member is formed of a synthetic polyamide material having a relatively low coefficient of friction.

References Cited

UNITED STATES PATENTS

| | | | |
|---|---|---|---|
| 2,795,962 | 6/1957 | Uher | 74—230.17(CC) |
| 3,066,546 | 12/1962 | Thostenson | 74—230.17(CC) |
| 3,266,330 | 8/1966 | Galleher | 74—230.17(CC) |
| 3,280,648 | 10/1966 | Nelson | 74—230.17(CC) |
| 3,434,363 | 3/1969 | Ruprecht et al. | 74—230.17(C) |

CORNELIUS J. HUSAR, Primary Examiner